United States Patent

[11] 3,524,379

| [72] | Inventor | Artur Fischer<br>133 Grunmettstetterstr.<br>D-7241 Tumlingen, Germany |
|---|---|---|
| [21] | Appl. No. | 777,510 |
| [22] | Filed | Nov. 20, 1968 |
| [45] | Patented | Aug. 18, 1970 |
| [32] | Priority | Nov. 22, 1967 |
| [33] | | Germany |
| [31] | | No. 1,625,338 |

[54] EXPANSION ANCHOR CONSTRUCTION
7 Claims, 2 Drawing Figs.

[52] U.S. Cl. ................................................... 85/74, 85/8.8
[51] Int. Cl. .................................................... F16b 13/06
[50] Field of Search ............................................ 85/73, 74, 75, 76, 77, 78, 67, 69, 86, 87, 63; 61/45B

[56] References Cited
UNITED STATES PATENTS

| 2,570,003 | 10/1951 | Palmer | 85/87 |
| 2,950,602 | 8/1960 | Lang | 85/63 |
| 2,955,504 | 10/1960 | Lovrinch et al. | 85/75 |
| 3,054,320 | 9/1962 | Dickow | 85/67 |
| 3,227,031 | 1/1966 | Williams | 85/67 |

FOREIGN PATENTS

| 21,739 | 8/1961 | Germany | 85/69 |
| 1,268,624 | 6/1961 | France | 61/45(B)UX |

*Primary Examiner*— Marion Parsons, Jr.
*Attorney*— Michael S. Striker

ABSTRACT: An expansion anchor has an expansion anchor sleeve whose leading end is arranged to be inserted into a hole in a support structure. An actuating member in form of a screw or the like extends through the sleeve and engages at the leading end an expander member so as to draw the same into the leading end thereby radially expanding the same when the screw is rotated. A ring is provided at the end of the expander member which is remote from the sleeve and is secured non-rotatably to the expander member with tongues projecting radially from the ring into engagement with the material of the support surrounding the bore to prevent rotation of the expander member with respect to the sleeve when the actuating member is turned.

Patented Aug. 18, 1970

3,524,379

Inventor:
ARTUR FISCHER

EXPANSION ANCHOR CONSTRUCTION

BACKGROUND OF THE INVENTION

The present invention relates to expansion anchors, and more particularly to the type of expansion anchor which is expanded by an expander member which is drawn into the leading end of the expansion anchor sleeve.

It is known to utilize expansion anchors, for instance of the type wherein an expander member is drawn into the leading end of an expansion anchor sleeve to thereby expand the latter, for securing heavy objects and the like to such support structures as masonry walls. Conventionally, a screw is inserted from the trailing end through the central passage of the expansion anchor sleeve to the leading end of the latter which is located inside of the hole in the support structure, and there meshes with threads provided on the usually conical expander member so that, when the screw is rotated, it will draw the expander member into the passage from the leading end towards the trailing end of the expansion anchor sleeve. However, this presupposes that the expander member cannot turn with the screw; because otherwise the expander member will of course simply turn rather than be drawn into the sleeve.

Unfortunately, it is possible that the friction between the expander member on the one hand and the sleeve on the other hand, or between the sleeve on the one hand and the material of the support structure surrounding the hole on the other hand, is smaller than the friction between the actuating member and the expander member. Under these circumstances the expander member will rotate as the actuating member, that is the screw is rotated, and the expander member will accordingly not be drawn into the sleeve. Evidently, this then prevents proper radial expansion of the sleeve.

Of course, attempts have been made to overcome this problem by providing suitable locking arrangements on the sleeve which engage the surrounding material of the support to prevent turning of the sleeve in the hole. The rotation of the expander member with respect to the sleeve is precluded by connecting the expander member with the sleeve in such a manner as to prevent such rotation, usually by projections provided on one and which engage into recesses provided on the other of these two elements. However, the provision of these locking projections on the sleeve and on the expander member is rather difficult and time-consuming, and accordingly increases the expense of manufacturing these expansion anchors which are basically mass-production items and should accordingly be inexpensive to manufacture so that they may be sold at low cost.

It is, accordingly, an object of the present invention to overcome the aforementioned disadvantages in a simpler and still more reliable manner than heretofore known.

SUMMARY OF THE INVENTION

In pursuance of the above object and others which will become apparent hereafter, one feature of my invention resides is providing an expansion anchor having an expansion anchor sleeve provided with a trailing end and a leading end which latter is arranged to be inserted into a hole in a support structure. An actuating member extends through the sleeve from the trailing end towards the leading end, and then expander member is located at the leading end and is arranged to be coupled with the actual leading member so as to be drawn into the sleeve with concomitant radial expansion of the latter in response to operation of the actuating member. In accordance with the central concept of my invention I provide means on the expander member which serves for preventing turning movement of the latter with reference to the sleeve while permitting the expander member to be drawn into the leading end of the sleeve.

This locking means is provided in form of an annular member whose inner periphery is received with a snap action in a circumferential groove provided at that end of the expansion member located remote from the leading end of the expansion anchor sleeve. Projections on the outer periphery of the annular member contact the surrounding material of the support structure and thus frictionally prevent rotation of the expander member with which the annular locking member is non-rotatably connected. Thus, the locking means is provided only on the expander member and can be connected thereto in a most simple and inexpensive manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
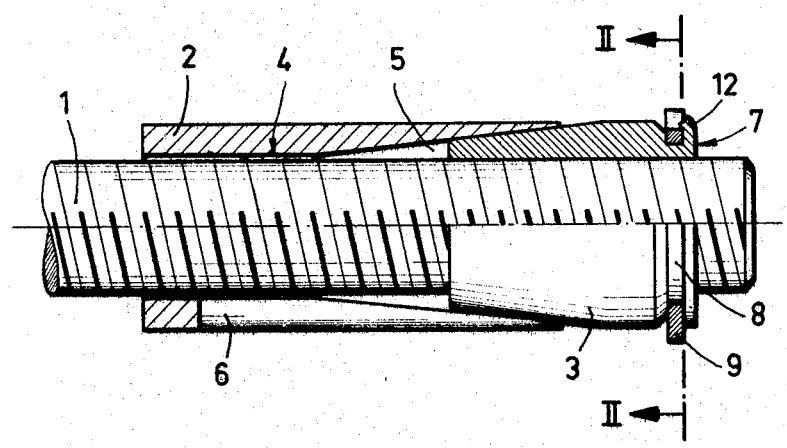
FIG. 1 is a longitudinal section through an expansion anchor embodying my invention.
Figure 2:
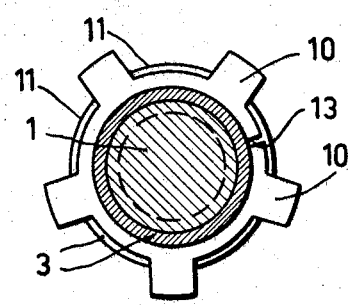
FIG. 2 is a section taken on the line II-II of FIG. 1.

Discussing now the drawing in detail it will be seen that the expansion anchor according to my invention is identified with reference numeral 1 and is shown only partially to the extent necessary to understand the invention. It comprises an expansion anchor sleeve 2 which may consist of synthetic plastic material and is of conventional construction. The leading end of the expansion anchor sleeve 2 is receivable in a hole in the support structure and located adjacent the leading end is the expander member 3 which advantageously may be of conical configuration. Accordingly, the central passage in the expansion anchor sleeve is also of conical cross-sectional configuration, at least in the region of the leading end of the sleeve 2.

An actuating member, here assumed to be a screw 1, is extended through the central passage of the sleeve 2 and meshes with screw threads provided in the expander member 3 so that, when the screw is rotated, it will draw the expander member 3 deeper into the conically configurated portion of the central passage in the leading end of the expansion anchor sleeve 2, thereby effecting radially outward expansion of the latter into tight frictional engagement with the material of the support surrounding the bore or hole in which the expansion anchor sleeve is received. Longitudinal slots 6, of which there may be one or more provided, facilitate this radial expansion.

In accordance with my invention the end of the expander member 3 which is remote from the leading end of the expansion anchor sleeve 2 and which is identified in the drawing with reference numeral 7, is provided with an outer circumferentially extending groove 8 in which an annular member 9 is received. The annular member 9 is non-rotatably connected with the expander member 3 and its snap-action introduction into the groove 8 may be facilitated by providing it with a radial slot 13.

The outer circumference of the annular member 9 which constitutes the locking means is provided with radially outwardly extending projections or tongues 10 which are circumferentially distributed. In the illustrated embodiment the non-rotatable connection between the member 9 and the member 3 is accomplished by offsetting portions 12 of a side wall bounding the groove 8 so that they extend into the spaces intermediate circumferentially adjacent ones of the projections 10, such spaces being identified with reference numeral 11.

It is advantageous if the projections 10 are yieldable in the axial direction of the annular member 9 and thereby of the sleeve 2, so as to facilitate ready advancement of the member 3 into the central passage of the member 2 in response to rotation of the screw 1, while yet reliably preventing rotational displacememt of the member 3 with respect to the member 2 and to the support structure.

Offsetting of the material of the member 3 into the spaces 11 can be accomplished with a suitable tool, for instance by hammer blows or any other desired manner. Of course, other possibilities for non-rotatably connecting the member 9 with the member 3 will offer themselves readily to those skilled in the art.

Resort to my novel invention eliminates any need for providing locking means on the expansion anchor sleeve 2 itself, and it is no longer necessary to non-rotatably connect the expansion anchor sleeve with the expander member 3.

The expansion anchor sleeve 2 may consist of synthetic plastic material, as may all of the other components, or some of them. Of course, other materials are also suitable for purposes of the present invention.

It will be understood that each of the elements described above, or two or more together, may also find a useful application in other types of constructions differing from the types described above.

While the invention has been illustrated and described as embodied in an expansion anchor, it is not intended to be limited to the details shown, since various modifications and structural changes may be made without departing in any way from the spirit of the present invention.

I claim:

1. In an expansion anchor, in combination, an expansion anchor sleeve having a trailing end and a leading end arranged to be inserted into a hole in a support structure; an actuating member extending through said sleeve from said trailing end towards said leading end; an expander member located at said leading end and arranged to be coupled with said actuating member so as to be drawn into said sleeve with concomitant radial expansion of the same in response to operation of said actuating member, said expander member having an end portion remote from said sleeve; a circumferential groove encircling said end portion; and an annular locking member provided with a radial slot extending between its outer and its inner periphery, said locking member being non-rotatably snapped into said groove and the outer portions of said locking member frictionally engaging the material of said support structure for preventing turning of said expander member with reference to said sleeve and support structure.

2. In an expansion anchor as defined in Claim 1, said actuating member being screw-threaded and drawing of said expander member into said sleeve being effected in response to rotation of said actuating member.

3. In an expansion anchor as defined in Claim 1, at least said sleeve consisting of synthetic plastic material.

4. In an expansion anchor as defined in Claim 1, said sleeve having a longitudinally extending central passage conically diverging in the region of said leading end and in direction away from said trailing end, said expander member having a configuration substantially complementary to the diverging portion of said central passage.

5. In an expansion anchor as defined in Claim 1, said sleeve being longitudinally slit at least in the region of said leading end to thereby facilitate radial expansion of said sleeve in response to drawing of said expander member into said leading end.

6. In an expansion anchor, in combination, an expansion anchor sleeve having a trailing end and a leading end arranged to be inserted into a hole in a support structure; an actuating member extending through said sleeve from said trailing end towards said leading end; an expander member located at said leading end and arranged to be coupled with said actuating member so as to be drawn into said sleeve with concomitant radial expansion of the same in response to operation of said actuating member, said expander member having an end portion remote from said sleeve; a circumferential groove encircling said end portion; and an annular locking member snapped into said groove and provided with a plurality of radially outwardly extending circumferentially distributed projections adapted to frictionally engage the material of said support structure for preventing turning movement of said locking member relative to said support structure, and the material of said expander member bounding said groove being upset at least in part intermediate adjacent ones of said projections to thereby preclude rotation of said locking member with reference to said expander member.

7. In an expansion anchor as defined in Claim 6, said projections being yieldable in the direction of elongation of said sleeve and said expander member to preclude interference with drawing of the latter into said leading end of said sleeve.